(12) United States Patent
Sundararaman et al.

(10) Patent No.: US 10,481,932 B2
(45) Date of Patent: Nov. 19, 2019

(54) AUTO-SCALING VIRTUAL SWITCHES

(71) Applicant: VMware, Inc., Palo Alto, CA (US)

(72) Inventors: Santhosh Sundararaman, Sunnyvale, CA (US); Jia Yu, Sunnyvale, CA (US); Mark Pariente, San Francisco, CA (US); Ganesan Chandrashekhar, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 364 days.

(21) Appl. No.: 14/230,186

(22) Filed: Mar. 31, 2014

(65) Prior Publication Data

US 2015/0277951 A1    Oct. 1, 2015

(51) Int. Cl.
| | | |
|---|---|---|
| *G06F 9/455* | (2018.01) | |
| *G06F 15/173* | (2006.01) | |
| *H04L 12/721* | (2013.01) | |
| *H04W 40/24* | (2009.01) | |
| *H04L 12/741* | (2013.01) | |
| *G06F 12/08* | (2016.01) | |
| *G06F 12/0802* | (2016.01) | |

(52) U.S. Cl.
CPC .......... *G06F 9/45558* (2013.01); *G06F 12/08* (2013.01); *G06F 12/0802* (2013.01); *G06F 2009/45583* (2013.01); *G06F 2009/45595* (2013.01); *G06F 2212/657* (2013.01)

(58) Field of Classification Search
CPC .... G06F 9/4405; G06F 12/08; G06F 9/45558; G06F 12/0802; G06F 2009/45595; G06F 2212/657; G06F 2009/45583

USPC ........................................................ 709/226
See application file for complete search history.

(56) References Cited

U.S. PATENT DOCUMENTS

| | | | | |
|---|---|---|---|---|
| 5,710,939 A | * | 1/1998 | Ballachino ............ | G06F 13/385 710/1 |
| 7,237,084 B2 | * | 6/2007 | Larson .................. | G06F 12/023 711/171 |
| 7,937,553 B2 | * | 5/2011 | Sakaguchi ............ | G06F 3/0608 711/170 |
| 7,941,630 B2 | * | 5/2011 | Eguchi .................. | G06F 3/0605 711/114 |
| 8,312,188 B1 | * | 11/2012 | White ...................... | G06F 5/14 709/235 |
| 8,315,187 B1 | * | 11/2012 | White ................. | H04L 47/6205 370/254 |
| 9,323,552 B1 | * | 4/2016 | Adogla ............... | G06F 9/45558 |
| 9,548,920 B2 | * | 1/2017 | Narasimha .............. | H04L 45/38 |
| 2005/0008011 A1 | * | 1/2005 | Georgiou ................ | H04L 49/90 370/389 |
| 2005/0078695 A1 | * | 4/2005 | Kishore .................. | H04L 47/10 370/412 |
| 2005/0232285 A1 | * | 10/2005 | Terrell ................ | H04L 67/1097 370/401 |

(Continued)

*Primary Examiner* — Kevin T Bates
*Assistant Examiner* — Golam Mahmud

(57) ABSTRACT

A port is dynamically added to and removed from a virtual switch. The new port may be allocated when there is sufficient free memory in a pool of memory associated with the virtual switch. When an existing port is deallocated, the portion of the pool of memory allocated to that existing port is freed up. As a result, a virtual machine that requires one or more ports on the virtual switch may be provisioned on a host so long as the pool of memory is sized properly and memory usage on the host is not excessive.

20 Claims, 5 Drawing Sheets

(56) References Cited

U.S. PATENT DOCUMENTS

| | | | |
|---|---|---|---|
| 2006/0230219 A1* | 10/2006 | Njoku | G06F 13/102 710/316 |
| 2007/0067435 A1* | 3/2007 | Landis | G06F 9/5016 709/224 |
| 2009/0292858 A1* | 11/2009 | Lambeth | H04L 29/12839 711/6 |
| 2011/0246742 A1* | 10/2011 | Kogen | G06F 12/023 711/170 |
| 2012/0124305 A1* | 5/2012 | Weissman | G06F 12/0223 711/160 |
| 2012/0254861 A1* | 10/2012 | Down, Jr. | G06F 8/63 718/1 |
| 2012/0281698 A1* | 11/2012 | Forster | H04L 41/0806 370/392 |
| 2012/0294192 A1* | 11/2012 | Masood | H04L 12/4645 370/255 |
| 2013/0054895 A1* | 2/2013 | Tuch | G06F 9/5016 711/118 |
| 2013/0070592 A1* | 3/2013 | Chen | H04L 47/22 370/230.1 |
| 2013/0074006 A1* | 3/2013 | Szeto | G06F 21/62 715/800 |
| 2013/0074066 A1* | 3/2013 | Sanzgiri | H04L 49/70 718/1 |
| 2013/0223438 A1* | 8/2013 | Tripathi | H04L 45/66 370/355 |
| 2014/0007097 A1* | 1/2014 | Chin | G06F 9/45533 718/1 |
| 2014/0181804 A1* | 6/2014 | Sakata | G06F 9/455 718/1 |
| 2015/0058580 A1* | 2/2015 | Lagar Cavilla | G06F 9/45558 711/149 |

* cited by examiner

AUTO-SCALING VIRTUAL SWITCHES

BACKGROUND

A virtual switch is an important part of a virtualized datacenter. The virtual switch provides network connectivity among virtual machines as well between the virtual machines and one or more external networks. When a virtual switch is created in a virtualized computing system, one of the configuration parameters defined at creation time is the maximum number of ports to be allocated to the virtual switch. This parameter is a static value and limits the number of virtual machine network interfaces that can be connected to the virtual switch at any one time. Once the limit is reached, the maximum number of ports parameter must be changed, which usually entails manual intervention by an end user. This limitation stands in the way of implementing a fully automated virtualized datacenter.

A number of issues arise in connection with virtual switches that are configured with a static maximum number of ports. First, when creating a virtual switch, an administrator needs to know ahead of time the number of virtual machines that may connect to the virtual switch. Further, virtual machine load-balancing solutions may be prevented from migrating virtual machines from an overburdened host to another host with under-utilized CPU and storage resources when virtual switches on the target host have all available ports allocated. In addition, ports that have been allocated to a virtual switch remain allocated to the virtual switch until an administrator manually deallocates them. Thus, without manual intervention, ports allocated to one virtual switch are unavailable for allocation to another (possibly busier) virtual switch. Finally, with a static maximum number of ports for a virtual switch, an administrator needs to continually monitor the number of ports allocated for each virtual switch defined on a host and, when necessary, redefine the maximum number of ports so that connections to a virtual switch are not refused.

One naïve solution to the above-described problem would be to allocate to each virtual switch a very large number of ports such that a port is likely to be available for any virtual machine that requires one. However, data structures that are allocated for virtual switch ports consume host memory. Thus, maintaining a large number of potentially inactive ports is likely to be wasteful. Another potential solution may be to configure a single large virtual switch that would service all virtual machines requiring network connectivity. This solution suffers from the same drawbacks as overallocating ports to separate virtual switches (i.e., the wasting of host memory). Further, defining a single switch with a large number of ports eliminates the ability to maintain different configurations for different virtual switches and makes isolating network traffic for different sets of virtual machines more difficult. In addition, a single virtual switch would prevent different types of virtual switches from coexisting on the same host. For example a VMware virtual switch and a Cisco virtual switch could not coexist on the same host.

SUMMARY OF THE DISCLOSURE

According to one or more embodiments, a port is dynamically added to and removed from a virtual switch. The new port may be allocated when there is sufficient free memory in a pool of memory associated with the virtual switch. When an existing port is deallocated, the portion of the pool of memory allocated to that existing port is freed up. As a result, a virtual machine that requires one or more ports on the virtual switch may be provisioned on a host so long as the pool of memory is sized properly and memory usage on the host is not excessive.

In one embodiment, a method of dynamically adding a new port to a virtual switch having ports allocated thereto is provided. The ports are allocated from a pool of memory that is associated with the virtual switch. The method comprises the steps of allocating an unused portion of the pool of memory to the new port and storing parameters of the new port in the allocated portion of the pool of memory. The method further comprises configuring the virtual switch to include the new port.

In a second embodiment, a method of dynamically removing a port that has been configured in a virtual switch having ports allocated thereto is provided. The ports are allocated to the virtual switch from a pool of memory that is associated with the virtual switch. The method comprises the steps of identifying a portion of the pool of memory that is allocated to the port to be removed and marking the identified portion as being available for allocation. The method further comprises removing the port from the virtual switch.

In a third embodiment, a method of provisioning a virtual machine on a host computer having one or more virtual switches configured therein is provided. The method comprises the steps of receiving a request to provision the virtual machine on the host computer and selecting a virtual switch on the host computer to be used by the virtual machine. The method further comprises allocating an unused portion of a pool of memory for a new port on the virtual switch. The method further comprises storing parameters of the new port in the allocated portion of the pool of memory. The method further comprises configuring the virtual switch to include the new port and configuring the virtual machine to access the new port.

DETAILED DESCRIPTION

Figure 1:
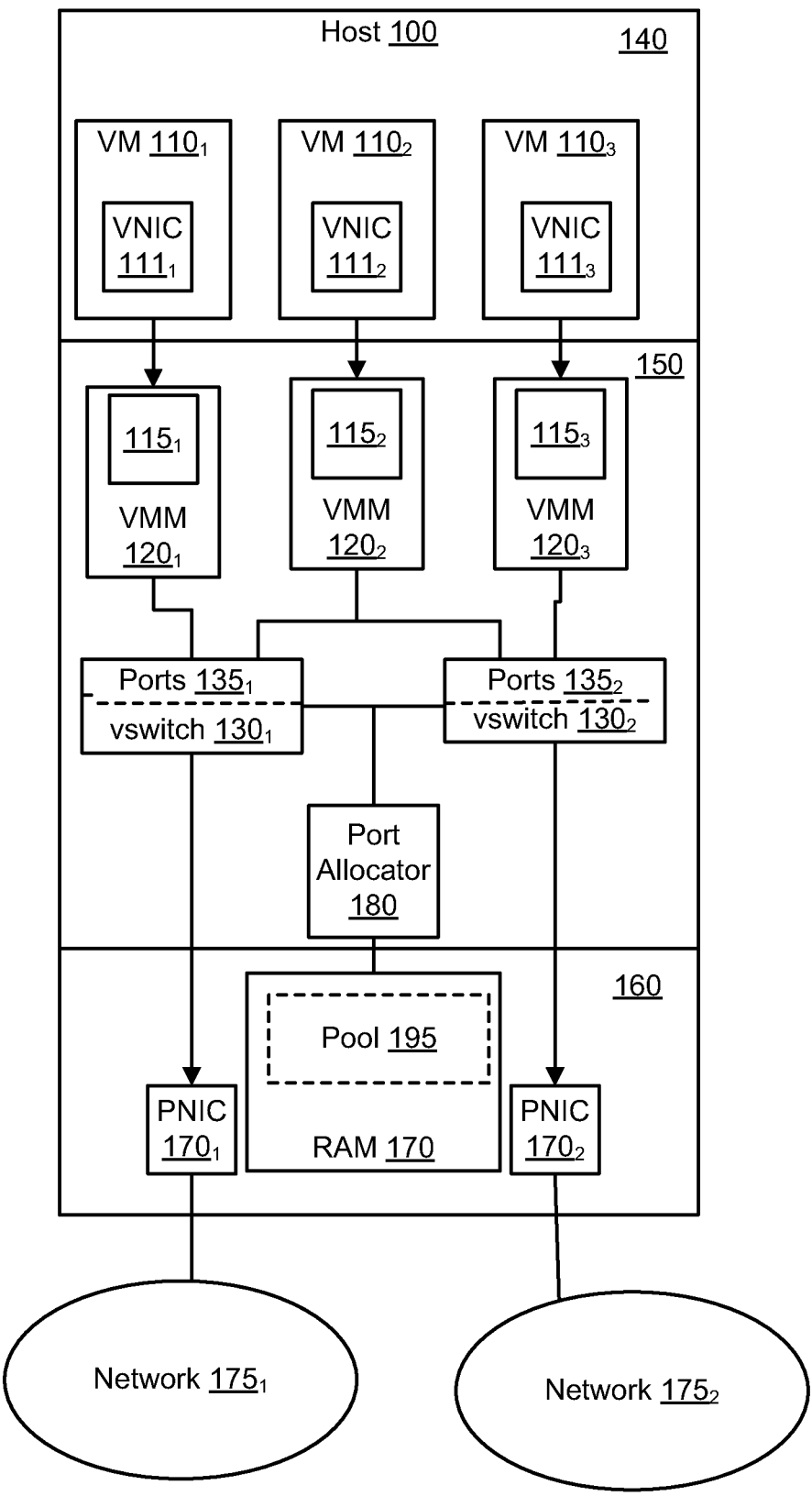
FIG. 1 is a block diagram depicting a host computer in which embodiments may be implemented.

FIG. 1 is a block diagram depicting a host computer in which embodiments may be implemented. In FIG. 1, host 100 is, typically, a server-class computer that supports the execution of virtualization software and one or more virtual machines (VMs). As shown in the figure, VMs $110_1$-$110_3$ execute in VM execution space 140. Each VM 110 encapsulates an emulated (or "virtualized") physical computing machine platform that is executed under the control of virtualization software. Further, each VM 110 implements a virtual hardware platform that supports installation and execution of a guest operating system (OS) which itself is capable of executing guest applications. Examples of a guest OS include any of the well-known commodity operating systems, such as Microsoft Windows, Linux, and the like. In each VM 110, the guest OS controls access to a virtual hardware platform. As shown in FIG. 1, the virtual hardware platform for each VM 110 includes virtual hardware devices, such as one or more virtual Network Interface Cards (or VNICs) 111. Virtual devices such as VNICs 111 are software abstractions that are often viewed as being a part of a VM 110. However, in embodiments, VNICs 111 are implemented by virtualization software using emulators, which are discussed below. The state of each VM 110 includes the state of its virtual devices, which is controlled and maintained by the underlying virtualization software.

Host 100 also includes a hypervisor 150. Hypervisor 150 is a virtualization software component that makes possible the concurrent instantiation and execution of one or more VMs 110 within virtual machine execution space 140. An example of hypervisor 150 is the hypervisor included as a component of VMware's vSphere® product, which is commercially available from VMware, Inc. of Palo Alto, Calif. It should be recognized that other virtualized hypervisors and virtualized computing platforms having different architectures are contemplated.

As shown, the interaction of a VM 110 with hypervisor 150 is facilitated by virtual machine monitors (VMMs) 120. In FIG. 1, each VMM $120_1$-$120_3$ is assigned to and monitors a corresponding VM $110_1$-$110_3$. Further, each VMM 120 includes a VNIC emulator 115. Each VNIC emulator 115 implements a VNIC 111, shown conceptually in FIG. 1 as residing in VM 110. VNIC 111 allows VM 110 to send and receive data to and from the VM. In embodiments, each VNIC emulator 115 maintains the state for the VNIC of a VM. It should be noted that a single VM may have one or more VNICs. For the purpose of illustration, FIG. 1 shows only one VNIC for each VM.

Each VMM 120 is communicatively coupled, via a VNIC 111, to one or more ports 135 of a virtual switch (vswitch) 130. A vswitch is a software component that runs within a hypervisor. A vswitch functions as a software bridge that allows multiple VMs to share physical NICs (PNICs) (which are described below) configured on a host. There may be cases where a vswitch is employed although there are no PNICs configured on a particular host. In such a case, the vswitch functions as a virtual network that connects different VMs that execute on the host. Thus, a vswitch forwards network traffic between the VNICs of different VMs. In embodiments where PNICs are configured on the host, a vswitch provides bridging to one or more physical networks via one or more PNICs. In general, a vswitch is capable of determining whether data received on a port 135 is destined for a local VM (i.e., a VM executing on the host) or to an outside network. In FIG. 1, two vswitches $130_1$ and $130_2$ are depicted. VNIC emulator $115_1$ connects to a port 135 on vswitch $130_1$, VNIC emulator $115_2$ connects to another port 135 on vswitch $130_1$, and VNIC emulator $115_3$ connects to a port 135 on vswitch $130_2$. Further, vswitch $130_1$ and $130_2$ are connected to each other via other ports 135.

In order for a vswitch to provide connectivity between VMs, or between a VM and an outside network, the vswitch has one or more ports configured therein. A vswitch may be thought of as a logical collection of "virtual" ports. Each port is a logical rendezvous point for a corresponding (i.e., connected) VNIC emulator, and includes software that forwards network traffic to and from the corresponding VNIC emulator. In order to support this functionality, a port must be allocated a certain amount of memory in which to execute this software. In prior art implementations, vswitches are configured with a static number of ports. For example, a system administrator may create a vswitch that has 128 or 256 ports. On host systems that have a large number of VMs executing therein, a vswitch 130 may refuse a connection from a particular VM because all of the ports on the vswitch are connected to (and in use by) other VMs.

The embodiment depicted in FIG. 1 also shows a port allocator 180. Port allocator 180 is a software component that resides in hypervisor 150. Port allocator 180 is responsible for dynamically allocating ports to each of the vswitches 130 configured in hypervisor 150. Port allocator 180 performs this dynamic allocation by allocating the memory required for a new port so that the new port may be associated with a vswitch and connect with a VNIC emulator corresponding to a VM. As shown, port allocator 180 allocates memory for ports 135 from a port memory pool 195, which is located in a portion of random access memory (RAM) 190 of host 100. In FIG. 1, port allocator 180 is depicted as connected to vswitches 130. However, this depiction is for the purpose of illustrating that port allocator 180 accesses discrete portions of pool 195 and allocates these pool portions for use as ports by the vswitches.

As discussed above, port allocator 180 dynamically allocates pool memory portions to be used as ports for one or more vswitches. More specifically, port allocator 180 allocates memory from pool 195 for one or more ports when there is a specific demand (or request) for such a port. For example, when a VM is provisioned or "powered on," its configuration will specify network connectivity parameters (e.g., a network (MAC) address, one or more physical networks that the VM must connect to, and the like). When the VM is started on the host (or "launched"), as a part of the startup process, the VM connects to a port on a vswitch that provides the VM with required network connectivity, in accordance with its configuration. At this time, port allocator 180 recognizes a demand for an additional port to be allocated to a target vswitch. Provided there is enough free memory in pool 195 from which to allocate a new port 135, port allocator 180 then proceeds to allocate the new port for the target vswitch. In embodiments, port allocator 180 also associates the newly allocated port with the target vswitch. Further, port allocator 180 performs the logical connection between the provisioned VM (or, more specifically, a VNIC emulator configured for the VM) and the newly allocated port.

In addition, port allocator 180 returns unused ports back to pool 195. This means that, when a VM is powered off, port allocator 180 is informed of the powering off of the VM and port allocator 180 returns the portion of memory previously allocated to ports used by the powered off VM to pool 195, and the returned memory may thus be re-allocated in the future to other (or to the same) VMs.

As depicted in FIG. 1, host 100 also includes a physical hardware layer 160. Physical hardware layer 160 typically includes one or more CPUs, RAM, and various device adapters for peripheral devices that are connected to host 100. For example, host 100 may be connected to a physical disk driver, a storage array, or a storage network. Such connectivity is achieved through an appropriate adapter, which hypervisor 150 communicates with via a device driver. In the embodiment shown in FIG. 1, hardware layer 160 includes two PNICs 170, which provide external network connectivity for host 100. As shown, hypervisor 150 transmits and receives network traffic via the vswitches 130 to and from PNICs 170. It should be understood that between the vswitches 130 and PNICs 170 there usually exists a series of network layers through which network traffic flows (from a vswitch 130 (a software abstraction) down to a PNIC 170 (a physical device)). Further, each PNIC 170 connects to a physical network 175. As shown in FIG. 1, PNIC $170_1$ provides connectivity to network $175_1$, while PNIC $170_2$ provides connectivity to network $175_2$. In such a configuration, certain vswitches may be restricted to communicate only over certain networks. For example, as shown, vswitch $130_1$ may only communicate with network $175_1$ over PNIC $170_1$, while vswitch $130_2$ may only communicate with network $175_2$ over PNIC $170_2$. Such segregation of network traffic is desirable to, for example, separate traffic for network testing from production network traffic.

FIG. 1 also depicts RAM 190, which is the random access memory of host 100. RAM 190 includes a portion of memory that is allocated by hypervisor 150 to a pool 195. As mentioned earlier, pool 195 is a portion of memory from which port allocator 180 allocates memory for the dynamic creation of ports for vswitches. Further, as was also mentioned, port allocator 180 returns memory portions to pool 195 when it is determined that one or more VMs no longer require ports.

Host 100 as depicted in FIG. 1 is only one an example of a host system that supports embodiments. It should be noted that other embodiments that have different numbers of VMs, vswitches, PNICs, or networks are contemplated.

Figure 2:
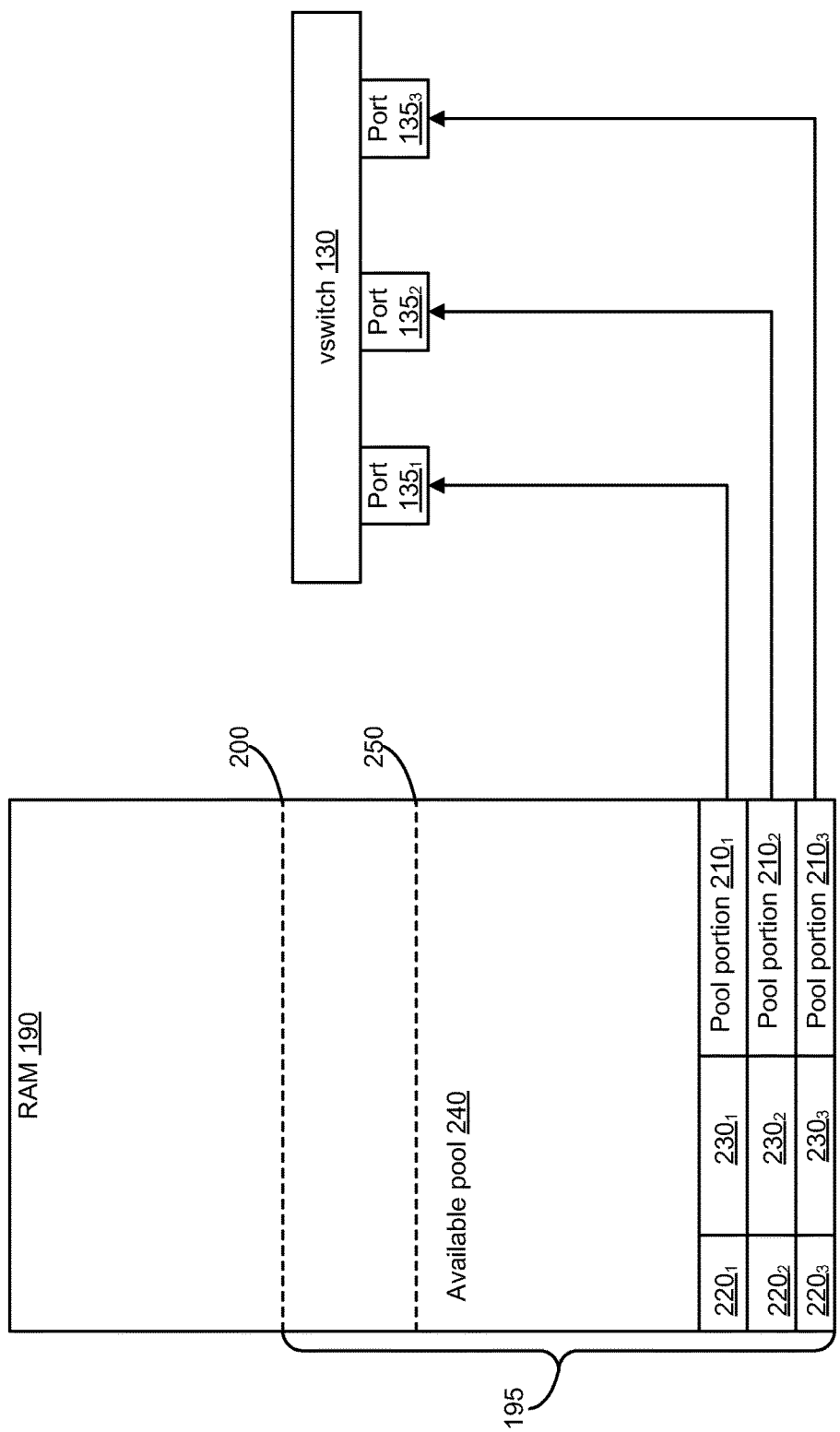
FIG. 2 is a block diagram that depicts an association of pool portions with ports of a vswitch, according to one or more embodiments.

FIG. 2 is a block diagram that depicts an association of pool portions with ports of a vswitch, according to one or more embodiments. FIG. 2 depicts a logical view of RAM 190. As shown, RAM 190 includes a memory region that is allocated as pool 195. Pool 195 comprises one or more pool portions 210. Each pool portion 210 schematically depicts an area of memory that is allocated to a particular port 135. In the embodiment shown in FIG. 2, pool portion $210_1$ is allocated to port $135_1$, pool portion $210_2$ is allocated to port $135_2$, and pool portion $210_3$ is allocated to port $135_3$. Each of ports $135_{1-3}$ is associated with vswitch 130. Further, in embodiments, a pool portion 210 is allocated to store a port ID 220 for a corresponding port, and data buffers 230, which contain data that is transmitted to and from the corresponding port.

As shown in FIG. 2, a maximum pool size 200 represents a maximum amount of RAM allocable to ports from pool 195. Maximum pool size 200 is a value that is calculated upon startup of the hypervisor. In embodiments, maximum pool size 200 is computed based on the maximum number of VMs that can execute simultaneously under the control of the hypervisor. This maximum number of simultaneously executing VMs is derived based on the number CPUs configured on the host and the amount of RAM on the host. Further, once the maximum number of VMs is computed, the number of VNICs that a single VM can support is factored into the calculation to arrive at the final maximum pool size 200.

FIG. 2 also depicts a region of memory within pool 195 that is referred to as the available pool memory 240. Available pool memory 240 represents a portion of pool 195 that is available to be allocated to ports. It should be noted that maximum pool size 200 is not a reserved amount of RAM allocable to ports. That is, the size of available pool memory 240 (as shown in FIG. 2) may be less than the difference between the maximum pool size 200 and the amount of memory allocated to pool portions 210. This is due to the fact that pool 195 is carved out of a portion of RAM referred to as the heap. Heap memory is typically set aside for dynamic memory allocation to programs and processes that require memory during execution. For example, a spreadsheet program that reads a large file into memory requires heap memory to be dynamically allocated for buffer space to hold portions of the file. It is possible for such programs (which are unrelated to the allocation of ports for vswitches) to place demands on heap memory that exceed the amount of heap memory above and beyond the difference between the total amount of heap memory and the maximum pool size 200. In such a situation, the hypervisor will allocate heap memory to those programs at the expense of potential future demands for port allocation. Thus, it is possible for demands for port allocation to be refused even when pool 195 is utilized to an extent that is less than the maximum pool size 200.

Such a situation is depicted in FIG. 2. A region between maximum pool size 200 and the region representing available pool memory 240 is allocated by the hypervisor to "non-port" related demands for memory. This occurs when the amount of heap memory demanded by other application and system programs (e.g., spreadsheets, word processors, and the memory demands of guest operating systems of VMs) is excessive. Thus, the amount of available pool memory 240 is reduced, as is the "effective" maximum size of pool 195 (indicated by the dotted line at 250). However, it should be noted that, as non-port related programs reduce their memory usage, and thus return memory back to the heap, the maximum size of pool 195 increases back toward maximum pool size 200. Consequently, the region of available pool memory 240 increases in size as well. However, in embodiments, maximum pool size 200 is a limit on the size of pool 195. That is, no amount of memory beyond maximum pool size 200 may be allocated from heap memory for vswitch ports.

However, in another embodiment, maximum pool size 200 is configurable by an administrator. In such an embodiment, a system administrator may access a configuration interface in order to set the maximum pool size. In such an embodiment, the maximum pool size 200 may be changed while the host system is running. This feature is useful when the amount of physical RAM is changed while the host executes. Such a change in available RAM is possible in systems that support hot-pluggable memory. In yet another embodiment, the hypervisor may be configured to recognize when the amount of available RAM changes and, in response, adjusts the maximum pool size accordingly.

Port allocator 180 (depicted in FIG. 1) allocates pool portions 210 based on the size of available pool memory 240. That is, if available pool memory 240 is less than the amount of memory that is required to be allocated for a port, then a request to allocate a port to a vswitch is refused. In embodiments, the available pool memory 240 is maintained by the hypervisor. In one or more embodiments, the hypervisor maintains a bitmap that corresponds to the heap memory, where each bit in the bitmap corresponds to one fixed portion of the heap and is updated to indicate whether a particular fixed portion is free to be allocated (for either a port or for some other use). In such embodiments, the hypervisor marks portions of the heap as allocated by setting a bit in the bitmap.

The hypervisor is also aware of the maximum pool size 200; indeed, when the hypervisor starts, maximum pool size 200 is set based on the available CPU and memory resources of the host. Finally, the hypervisor also tracks the amount of memory already allocated from pool 195 for ports. Thus, in embodiments, the hypervisor computes the amount of available pool memory 240 and provides this amount to port allocator 180. The hypervisor computes available pool memory by determining whether the amount of heap memory allocated to non-port related programs is greater than the difference between the total amount of heap memory and the maximum pool size 200. If the amount of heap memory allocated to non-port related programs exceeds this difference, then the hypervisor determines available pool size 240 as the difference between the amount of heap memory allocated to non-port related programs and the amount of heap memory already allocated for ports (i.e., allocated to pool portions 210). Otherwise, the hypervisor determines the available pool size 240 as the difference between the maximum pool size 200 and the amount of heap memory allocated for ports. In any case, it should be noted that embodiments of the invention are not limited to the aforementioned methods of managing pool 195.

Further, in one or more embodiments, port ID 220 is a fixed-length, 32-bit binary number. In certain embodiments, port ID 220 is segmented into three different parts. A first segment of port ID 220 is a fixed-length field that typically represents an identifier for a particular vswitch on a host. A second segment is a fixed-length field that typically represents a port number (or index) for the vswitch identified in the first segment. For example, if the first segment of a port ID is four bits in length and stores the binary number 1000, and the second segment is eight bits in length and stores the binary number 10001000, then the port ID identifies a port as located on vswitch 8 (i.e., binary value 1000), port 136 (i.e., binary value 10001000). The third segment of port ID 220 is usually reserved for flags and other indicative data related to the corresponding port. It should be noted that the number of bits that comprise the second segment of port ID 220 (i.e., the port number on the vswitch) is determined based on the maximum size of the pool (i.e., maximum pool size 200 in FIG. 2). As previously mentioned, this determination is made at the time that the hypervisor is started (i.e., at system boot time). Thus, assuming that the hypervisor determines and sets the maximum pool size 200 to be large enough to support the allocation of 256 ports per vswitch, then the hypervisor sets the second segment of port ID 220 to be eight bits in length (i.e., $2^8$=256 ports).

Figure 3:
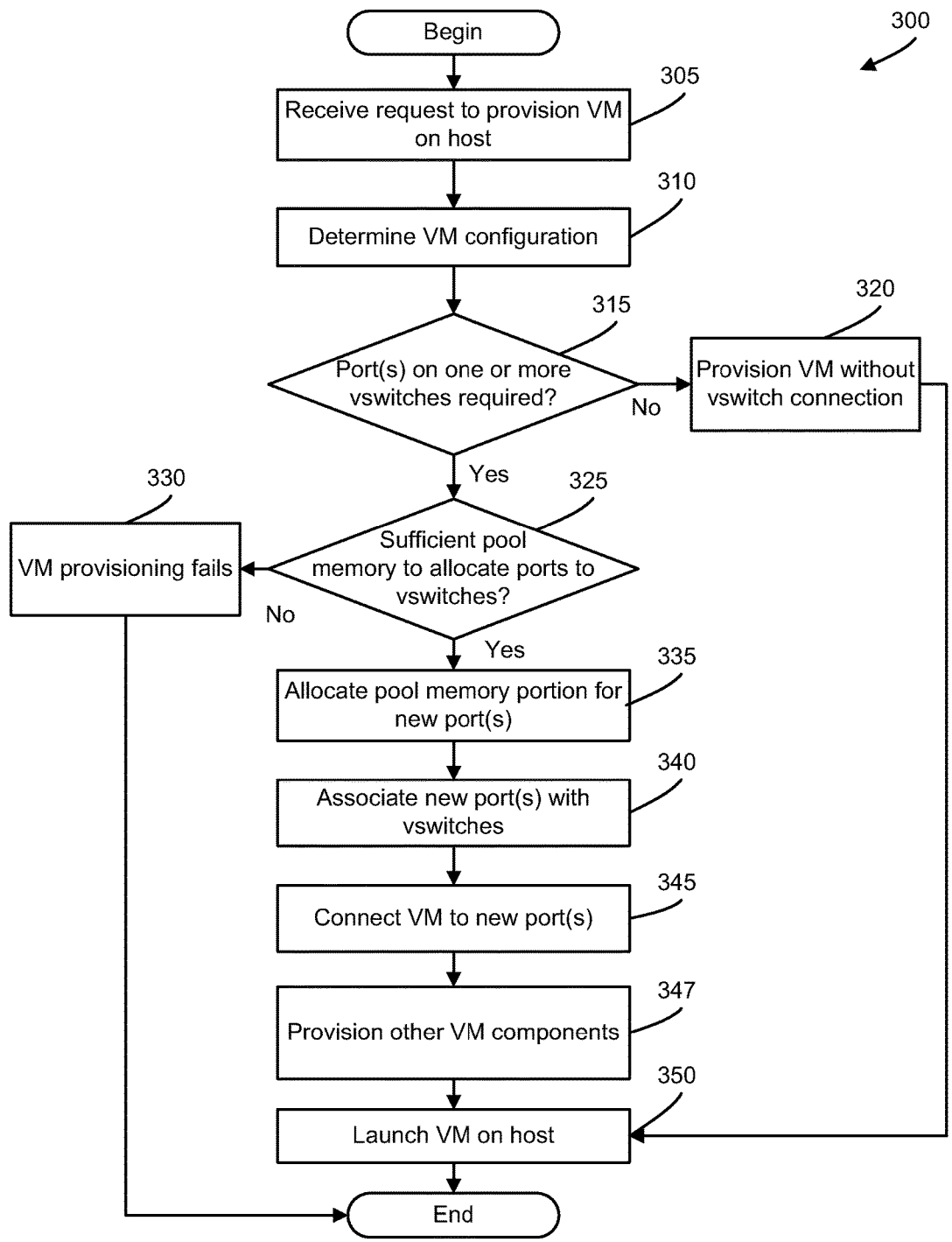
FIG. 3 is a flow diagram that illustrates a method of provisioning a virtual machine that requires access to one or more ports allocated to a vswitch, according to one or more embodiments.

FIG. 3 is a flow diagram that illustrates a method 300 for provisioning a virtual machine that requires access to one or more ports allocated to a vswitch, according to one or more embodiments. Method 300 begins at step 305, where hypervisor 150 receives a request to provision a VM for execution on host 100. Next, at step 310, hypervisor 150 determines the configuration for the to-be-provisioned VM. For example, a system administrator may request, through an administrative user interface, that a virtual machine having certain features be created and deployed. In such a case, the system administrator configures various features, which hypervisor 150 receives and analyzes in order to create and execute the virtual machine.

After determining the configuration of the VM, method 300 proceeds to step 315. At step 315, method 300 determines whether the VM requires one or more ports on one or more vswitches that are configured in hypervisor 150. For example, an administrator may configure a VNIC within the VM, and then specify that the VNIC is to be connected to a particular vswitch. In such a case, method 300 at step 315 determines that one or more ports are required for the VM.

In the event that it is determined that no network ports need to be allocated for the VM being provisioned, method 300 proceeds to step 320. At step 320, the VM is provisioned on the host without allocating any ports to a vswitch. However, if, at step 315, it is determined that one or more ports are required for the to-be-provisioned VM, then method 300 proceeds to step 325.

At step 325, a determination is made whether there is sufficient memory available in pool 195 in order to allocate the required number of ports for the VM being provisioned. As mentioned above, in embodiments, pool 195 is a portion of heap memory in RAM 190 that may be allocated up to or less than its maximum size (i.e., pool size 200 from FIG. 2), depending on memory usage by other memory consumers within the host. Thus, at step 325, the hypervisor determines whether there is enough available pool memory to satisfy the allocation of the required number of ports for the VM based on the maximum pool size, the amount of heap memory allocated to non-port related programs, and on the amount of heap memory already allocated for vswitch ports. If there is insufficient available pool memory from which to allocate the required number of ports, method 300 proceeds to step 330 where the VM provisioning fails. If the port allocator determines that there is sufficient memory from which to allocate additional ports, then method 300 proceeds to step 335.

At step 335, memory from the pool (pool 195 in FIG. 1) is allocated for one or more ports that are required by the VM being provisioned. The memory is allocated from the pool as one or more pool portions. After allocating one or more pool portions for use as ports, method 300 then proceeds to step 340. At step 340, the new ports that are allocated from the pool are associated with a vswitch. In one or more embodiments, this association is accomplished by updating a field in the port ID corresponding to the allocated port. Further, the port allocator makes a determination as to which of a number of existing vswitches the port should be associated with. This determination is made based on the configuration of the VM that is being provisioned. For example, the configuration of the VM might indicate that the VM requires connectivity to a certain physical network 175 (e.g., a network for a particular customer that runs VMs on the host). In such a case, the port allocator determines which of the vswitches are connected to the required network 175 and, after selecting one of these vswitches, associates the newly allocated port to the selected vswitch.

Next, at step 345, the port allocator "connects" the VM to the allocated port(s) by configuring the VNIC emulator(s) that corresponds to the VM such that communication with the newly allocated port(s) on the selected vswitch is enabled. After connecting the VM to the newly allocated port, method 300 proceeds to step 347, where the provisioning of the VM is completed. After step 347, the VM is launched on the host at step 350. After step 347, method 300 terminates.

Figure 4:
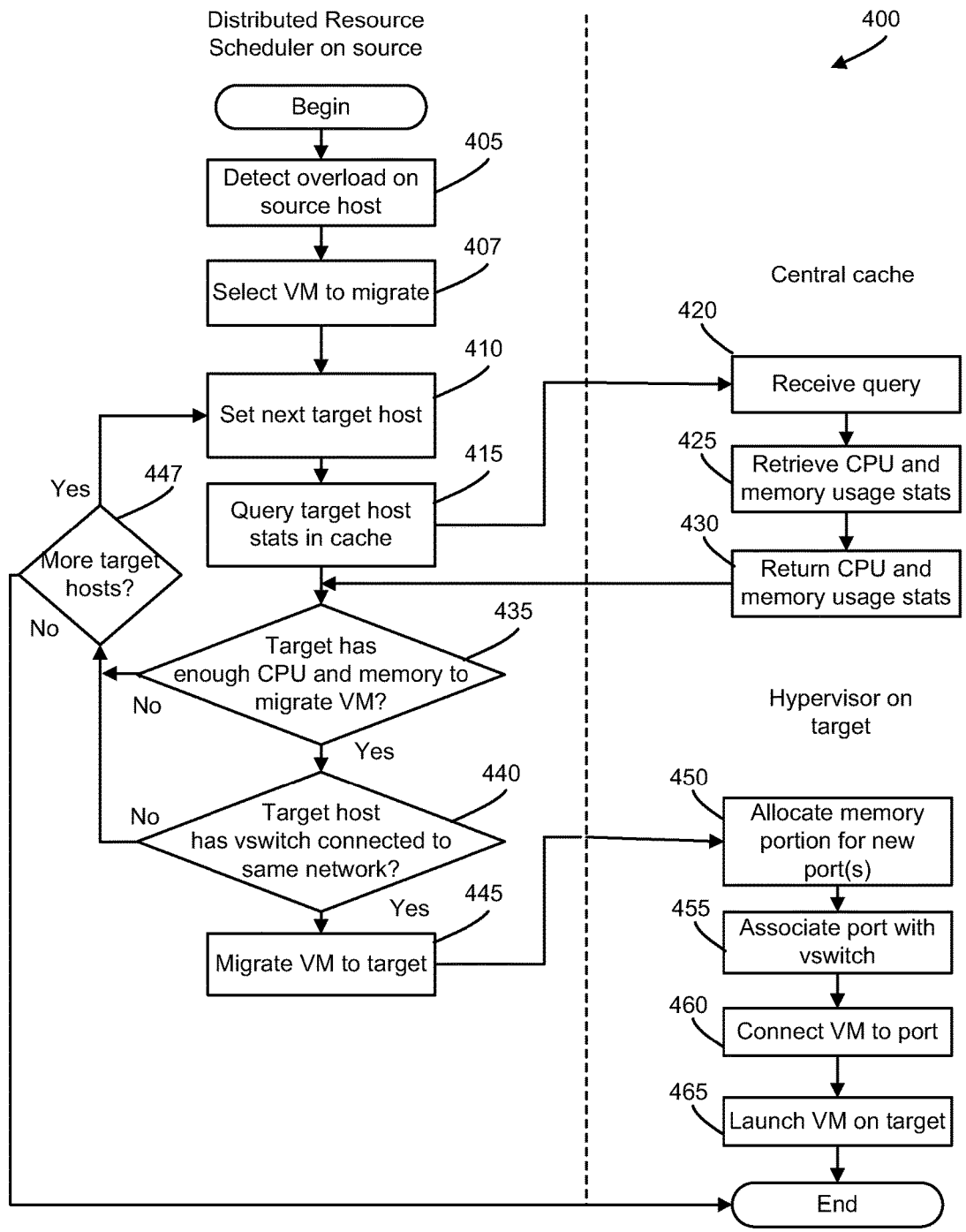
FIG. 4 is a flow diagram that depicts a method of migrating a VM that executes on a source host to a target host in accordance with embodiments of the invention.

FIG. 4 is a flow diagram that depicts a method 400 for migrating a VM that executes on a source host to a target host in accordance with embodiments of the invention. As shown in FIG. 4, two software components collaborate to accomplish the migration. One component is referred to as a Distributed Resource Scheduler (or DRS). DRS is a software component that executes in a management server for a networked cluster of hosts. The main task of DRS is to perform load balancing among the various hosts that execute in the cluster. Thus, DRS monitors the hosts in the cluster and detects performance issues and/or bottlenecks on those hosts. When a performance problem is detected on a particular host, DRS performs, among other things, the migration of workload from that host to another host. Usually this entails the migration of one or more virtual machines from the host experiencing the performance problem to one or more other hosts in the cluster that have the excess capacity to run those virtual machines.

As shown in FIG. 4, the other software component is a hypervisor (e.g., hypervisor 150 in FIG. 1). In FIG. 4, the steps executed by the hypervisor are executed on each of the hosts in the cluster selected by DRS as a potential migration target. Method 400 begins at step 405, where DRS detects an overload on a source host in which one or more VMs are executing. Examples of overloads that may be detected include overutilization of CPU resources, running out of disk space for virtual machines, or undue paging (i.e., thrashing) by the hypervisor on the source host.

Once DRS 405 detects an overload on the source host, DRS selects one or more VMs to be migrated from the source host at step 407. After selecting VMs to be migrated, DRS searches for potential target hosts that the VMs are to be migrated to. At step 410, a next target host is set. In embodiments, DRS has knowledge of and access to all hosts in the cluster. After setting the next target host, DRS, at step 415, issues a query to obtain CPU and memory usage statistics for the target host from a central cache that DRS periodically updates. The query is received at the central cache at step 420.

In response to receiving the query at step 420, the CPU and memory usage statistics for the target host are retrieved and returned from the central cache at steps 425 and 430, respectively. It should be noted that, in alternative embodiments, DRS may forego querying a central cache in order to retrieve CPU and memory usage statistics for a target host. In such embodiments, DRS transmits a query directly to the hypervisor that runs on the target host. In such instances, it is the hypervisor that collects the CPU and memory usage statistics for the target host and transmits the collected statistics back to DRS.

In order to support dynamic allocation of ports, the statistics retrieved for the target host include, in some embodiments, the maximum size of the pool on the target host from which ports are allocated from, the amount of pool memory that has already been allocated to ports, and the amount of free heap memory in the RAM of the target host. In other embodiments, the amount of available pool memory is not retrieved; in these embodiments, DRS is able to determine whether a target system has enough memory resources to support the migrated VM based only on the RAM utilization of the target.

Further, in embodiments, DRS receives connectivity data for all vswitches that are configured on the target host. Specifically, in embodiments, DRS receives identifiers for the networks that each vswitch is connected to. These identifiers are retrieved and returned because, if a VM is connected to a particular vswitch on a source host that is itself connected to a particular network, then the VM should be migrated to a target host that has configured therein one or more vswitches that are also connected to that same particular network. If such a VM is migrated to a target host that lacks a vswitch with a connection to the same networks that the VM has connectivity to on the source host, then the migrated VM would not execute properly on the target host.

After receiving the retrieved CPU, memory usage, and connectivity data, DRS then determines, among other things, at step 435, whether the target host has sufficient CPU and memory resources to support the migration of the VM. As long as there are enough CPU and memory resources to support migration of the VM, then the target system has sufficient pool memory from which to allocate ports for the VM that is to be migrated. If DRS determines at step 435 that the target host has insufficient CPU and memory resources, then method 400 proceeds to step 447 to determine whether there are additional potential target hosts in the cluster that DRS may query. If there are additional target hosts, then method 400 proceeds back to step 410 to set a next target host. After step 410, method 400 proceeds to query statistics for the next target host at step 415 as previously described. However, if there are no more target hosts in the cluster, then method 400 terminates.

If, at step 435, DRS determines that there are sufficient CPU and memory resources on the target host, method 400 then proceeds to step 440. At step 440, DRS determines whether the target host has configured therein a vswitch that has connectivity to the same networks that the VM to be migrated is connected to on the source host. If DRS determines that the target host does not have a vswitch that is connected to the same networks that the to-be-migrated VM is connected to, then DRS determines that the target host is not an appropriate migration target. Hence, method 400 proceeds back to step 447 to determine whether there are any remaining hosts in the cluster to query.

If, however, DRS determines that a given target host has sufficient pool memory from which to allocate ports and includes a vswitch that is connected to the same network or networks that the to-be-migrated VM is connected to (via a vswitch on the source host), then DRS determines that the target host is an appropriate migration target and, at step 445, proceeds to begin to migrate the VM to the target host. The hypervisor at the target host receives notification of the migration and provisions a VM on the target host. The steps that the hypervisor performs to accomplish the provisioning are similar to those depicted in FIG. 3. Specifically, a port allocator (a component of the hypervisor on the target host), at step 450, allocates one or more pool portions from the pool on the target host, where each pool portion is allocated for use by a port. Next, at step 455, the port allocator associates the allocated ports with a vswitch that has the required network connectivity for the VM. At step 460, the port allocator connects the VM to the allocated port by configuring VNIC emulators that correspond to the migrated VM. Finally, at step 465, the migrated VM is launched on the target host. After step 465, method 400 terminates.

Figure 5:
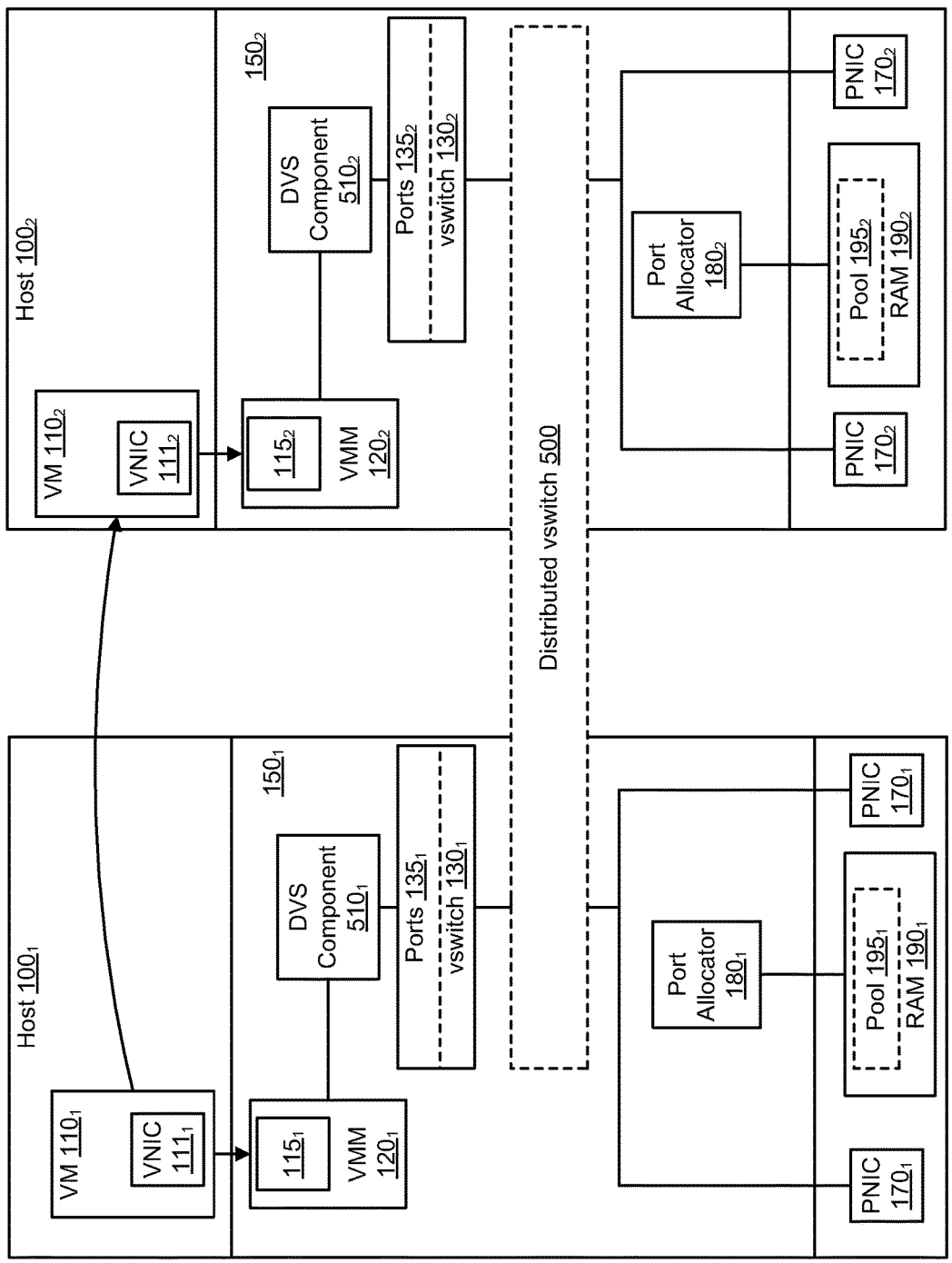
FIG. 5 is a block diagram that illustrates a cluster of hosts that includes a distributed virtual switch, according to embodiments.

Each of the vswitches described thus far are created within a hypervisor of a single host. However, a construct referred to as a distributed virtual switch (DVS) allows for vswitches that exist on different hosts in a cluster of hosts to be logically associated for network management purposes. The concept is illustrated in the block diagram of FIG. 5. FIG. 5 depicts two hosts $100_1$ and $100_2$, each of which belongs to a cluster and supports the execution of one or more VMs 110 therein. As shown in FIG. 5, a distributed virtual switch (DVS) 500 is a software abstraction of a vswitch 130 that spans multiple hosts 100. In FIG. 5, DVS 500 includes vswitch $130_1$ on host $100_1$ and vswitch $130_2$ on host $100_2$. In general, DVS 500 may be centrally configured by a system administrator, whereby any configuration changes made to DVS 500 are applied to the vswitches 130 that comprise DVS 500. Further, when a host is added to the cluster shown in FIG. 5 (which includes DVS 500), a new vswitch 130 is instantiated within a hypervisor for the newly added host. The newly instantiated vswitch is created with the same features and configuration as the centrally configured DVS 500, thereby eliminating the need to separately configure vswitches that exist on different hosts.

In addition, a feature that DVS 500 provides is the preservation of state information corresponding to the ports that are logically associated with the DVS. As shown in FIG. 5, each host includes a DVS component 510. In embodiments, DVS component 510 serves as a distributed virtual port for a VM 110. Specifically, a VNIC emulator 115 is communicatively coupled to DVS component 510. DVS component communicates with vswitch 130 through a port 135. DVS 510 also includes, in one or more embodiments, a local storage that stores runtime state information for the distributed virtual port. In embodiments, this information may be stored in a persistent datastore (not shown). Thus, when a VM is migrated from a source host to a target host, the runtime state of the distributed virtual port is migrated with the VM.

When a VM is migrated between hosts in a cluster with a DVS configured on both source and target hosts, both a DVS component and a port are instantiated on the target host. Thus, referring to FIG. 5, VM $110_1$ is migrated from host $100_1$ to host $100_2$. As shown, hosts $100_1$ and $100_2$ are configured to include DVS 500. DVS 500 includes vswitch $130_1$ on host $100_1$ and vswitch $130_2$ on host $100_2$. When VM $110_1$ is migrated from host $100_1$ to VM $110_2$ on host $100_2$, DVS component $510_2$ is created as a distributed virtual port to be used by VM $110_2$ after migration. After migration, DVS $510_2$ also stores the runtime state of the distributed virtual port of VM $110_1$ on host $100_1$ just prior to migration (which was contained in DVS $510_1$). As shown, DVS $510_2$ is connected to VNIC emulator $115_2$, which provides network connectivity for the migrated VM $110_2$. In addition, DVS component $510_2$ is connected to a newly instantiated port $135_2$ in vswitch $130_2$. According to embodiments of the present invention, port $135_2$ is dynamically allocated by port allocator $180_2$ from pool $195_2$, as shown in FIG. 5.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A system comprising:
one or more hosts, each host having virtual machines executing therein and a plurality of virtual switches configured to transmit data to and from the virtual machines, a virtual switch from the plurality of virtual switches having ports allocated thereto from a pool of port memory associated with the virtual switch, wherein each of the ports includes software for forwarding network traffic to and from the corresponding virtual machine, the pool of port memory having a maximum pool size allocable to ports and one or more processors configured to:
allocate a new port to the virtual switch by:
determining a size of unused portions of the pool of port memory;
determining that the size of unused portions of the pool of port memory for allocating the new port that is not allocated to any of the plurality of virtual switches is a above a threshold;
allocating an unused portion of the pool of port memory for the new port when the size of unused portions of the pool of port memory for allocating the new port is above the threshold;
instantiating the new port in the allocated portion of the pool of port memory;
associating the new port to the virtual switch; and configuring the virtual switch to include the new port.

2. The system of claim 1, wherein the processor is further programmed to:
receive a request to provision a virtual machine;
determine that the virtual machine requires a port not currently allocated to the virtual switch; and
based on determining that the virtual machine requires a port not currently allocated to the virtual switch, allocate the new port to the virtual machine.

3. The system of claim 2, wherein the processor is further programmed to configure a virtual network interface to access the new port, wherein the virtual machine accesses the new port through the virtual network interface.

4. The system of claim 1, wherein the pool of port memory is a portion of a heap memory managed by a hypervisor executing in one of the hosts.

5. The system of claim 1, wherein the virtual switch includes a port that connects to one or more external networks.

6. The system of claim 1, wherein the virtual switch is a distributed virtual switch that spans multiple hosts.

7. A non-transitory computer-readable medium comprising instructions executable by a host in a virtualized computing environment, the host having virtual machines executing therein and a plurality of virtual switches configured to transmit data to and from the virtual machines executing therein, and a plurality of virtual switches configured to transmit data to and from the virtual machines, a virtual switch from the plurality of virtual switches having ports allocated thereto from a pool of port memory associated with the virtual switch, wherein each of the ports includes software for forwarding network traffic to and from the corresponding virtual machine, the pool of port memory having a maximum pool size allocable to ports, where the instructions, when executed, cause the host to perform operations comprising:
allocate a new port to the virtual switch by:
determining a size of unused portions of the pool of port memory;
determining that the size of unused portions of the pool of port memory for allocating the new port that is not allocated to any of the plurliaty of virtual switches is above a threshold;
allocating an unused portion of the pool of port memory for the new port when the size of unused portions of the pool of port memory for allocating the new port is above the threshold;
instantiating the new port in the allocated portion of the pool of port memory;
associating the new port to the virtual switch; and
configuring the virtual switch to include the new port.

8. The computer-readable medium of claim 7, wherein the instructions, when executed, cause the host to perform further operations comprising determining that a virtual machine needs a port not allocated to the virtual switch.

9. The computer-readable medium of claim 8, wherein the instructions, when executed, cause the host to perform further operations comprising:
receive a request to provision the virtual machine; and
based on determining that the virtual machine needs a port not allocated to the virtual switch, allocate the new port to the virtual machine.

10. The computer-readable medium of claim 9, wherein the processor is further programmed to configure a virtual network interface to access the new port, wherein the virtual machine accesses the new port through the virtual network interface.

11. The computer-readable medium of claim 7, wherein the pool of port memory is a portion of a heap memory managed by a hypervisor executing in the host.

12. A method of provisioning a virtual machine on a host computer having virtual switches configured therein, a virtual switch from the one or more virtual switches having ports allocated thereto from a pool of port memory associated with the virtual switch, the pool of port memory having a maximum pool size allocable to ports, wherein each of the ports includes software for forwarding network traffic to and from the corresponding virtual machine, the method comprising:
allocate a new port to the virtual switch by:
determining a size of unused portions of the pool of port memory, wherein the pool of port memory comprises a maximum pool size for port memory;
determining that the size of unused portions of the pool of port memory for allocating the new port that is not allocated to any of the virtual switches is above a threshold;
allocating an unused portion of the pool of port memory for the new port when the size of the unused portions of the pool of port memory for allocating the new port is above the threshold;
instantiating the new port in the allocated portion of the pool of port memory;
associating the new port to the virtual switch;
configuring the virtual switch to include the new port; and
configuring the virtual machine to access the new port.

13. The method of claim 12, wherein configuring the virtual machine to access the new port comprises configuring a virtual network interface of the virtual machine.

14. The method of claim 12, further comprising receiving a request to provision the virtual machine on the host computer, wherein the request to provision is received in conjunction with powering-on the virtual machine on the host computer.

15. The method of claim 14, wherein the request to provision is received in conjunction with migrating the virtual machine to the host computer from a source host computer.

16. The method of claim 15, further comprising:
selecting the virtual switch to be used by the virtual machine; and
wherein said selecting includes:
determining that the virtual switch has connectivity to a physical network to which the virtual machine was connected in the source host computer prior to the migration.

17. The method of claim 15, further comprising:
selecting a target host computer; and
migrating the virtual machine to the target host computer.

18. The method of claim 17, wherein the target host computer is selected based on CPU and memory utilization on the target host computer.

19. The method of claim 1, wherein allocating an unused portion of the pool of port memory to the new port further comprises allocating a portion of memory as a data buffer for the new port.

20. The method of claim 12, wherein the pool of port memory is a portion of a heap memory managed by a hypervisor executing in the host.

* * * * *